(12) United States Patent
Buhr

(10) Patent No.: US 11,993,945 B1
(45) Date of Patent: May 28, 2024

(54) COLLAPSIBLE POLE STAND

(71) Applicant: Christopher John Buhr, Maricopa, AZ (US)

(72) Inventor: Christopher John Buhr, Maricopa, AZ (US)

( * ) Notice: Subject to any disclaimer, the term of this patent is extended or adjusted under 35 U.S.C. 154(b) by 0 days.

(21) Appl. No.: 17/714,836

(22) Filed: Apr. 6, 2022

(51) Int. Cl.
*E04H 12/22* (2006.01)
*F16M 11/22* (2006.01)
*F16M 11/38* (2006.01)

(52) U.S. Cl.
CPC ......... *E04H 12/2238* (2013.01); *F16M 11/22* (2013.01); *F16M 11/38* (2013.01)

(58) Field of Classification Search
CPC .... E04H 12/2238; F16M 11/38; F16M 11/22; F16M 2200/08; F16M 11/16; F16M 11/28; F41C 27/00; F41A 23/08; F41A 23/12; A47B 3/12; A47B 3/002
USPC .......................................................... 248/167
See application file for complete search history.

(56) References Cited

U.S. PATENT DOCUMENTS

| | | | | |
|---|---|---|---|---|
| 283,885 A * | 8/1883 | Hatcher | .................. | F16M 11/22 248/167 |
| 291,605 A * | 1/1884 | Knox | ...................... | F16M 11/22 248/167 |
| 358,836 A * | 3/1887 | Casler | ...................... | G10G 5/00 248/167 |
| 391,629 A * | 10/1888 | McGovern | ............... | G10G 5/00 248/167 |
| 606,022 A * | 6/1898 | Patchell | ............... | A47B 13/021 248/188 |
| 648,560 A * | 5/1900 | Haskell | ..................... | G10G 5/00 248/167 |
| 927,746 A * | 7/1909 | Murphy | ................. | F16M 11/00 248/165 |
| 1,101,402 A * | 6/1914 | Carroll | ...................... | A47B 3/12 248/431 |
| 1,266,316 A * | 5/1918 | Raymond | ............... | F16M 11/22 248/167 |
| 1,823,616 A * | 9/1931 | Leslie | ....................... | A47B 3/12 248/167 |
| 2,706,609 A * | 4/1955 | Sullivan | .................. | B65G 13/12 211/151 |
| 3,016,802 A * | 1/1962 | Grunenberg | ............. | F41A 23/12 89/40.06 |
| 3,445,129 A * | 5/1969 | Penote | ....................... | E04G 7/02 403/182 |
| RE30,020 E * | 6/1979 | Spencer | .................... | E04G 1/34 248/167 |
| 4,265,045 A * | 5/1981 | Garbini | ................... | F41A 23/00 42/94 |
| 4,406,437 A * | 9/1983 | Wright | ................... | F16M 11/22 248/188.7 |

(Continued)

*Primary Examiner* — Taylor Morris
(74) *Attorney, Agent, or Firm* — Plager Schack LLP; Mark H. Plager; Kara Verryt

(57) ABSTRACT

A collapsible pole stand for holding a pole may include a shaft; a pair of arms extending from a top end of the shaft, wherein the pair of arms form an upward V-shape; a middle collar rotatably engaged with a middle section of the shaft; a pair of long legs attached to and extending from the middle collar, wherein the pair of long legs form a downward V-shape; a lower collar engaged with a bottom section of the shaft; and a pair of short legs attached to and extending from the lower collar, wherein the pair of short legs form a smaller downward V-shape.

8 Claims, 4 Drawing Sheets

(56) References Cited

U.S. PATENT DOCUMENTS

| | | | | |
|---|---|---|---|---|
| 4,535,559 A * | 8/1985 | Hall | F41A 23/14 42/94 |
| 4,541,597 A * | 9/1985 | Davanture | A47B 3/12 248/172 |
| 4,801,123 A * | 1/1989 | Lynch | F16M 11/22 248/524 |
| 4,846,353 A * | 7/1989 | Knight | B62H 3/00 211/189 |
| 4,905,612 A * | 3/1990 | Apissomian | A47B 3/12 248/167 |
| 5,060,410 A * | 10/1991 | Mueller | F41A 23/02 42/94 |
| 5,143,175 A * | 9/1992 | Tomko | B27B 17/0075 269/902 |
| 5,290,004 A * | 3/1994 | Frost | A47G 33/12 248/188.7 |
| 5,377,779 A * | 1/1995 | Slapnicka | B25H 1/06 D25/67 |
| 5,421,115 A * | 6/1995 | McKay | F41A 23/12 248/163.1 |
| 5,871,185 A * | 2/1999 | Phillips | F16M 11/16 248/167 |
| 6,138,977 A * | 10/2000 | Tsai | F16M 11/22 248/529 |
| 6,234,443 B1 * | 5/2001 | Tsai | A47G 33/12 248/519 |
| 6,293,512 B1 * | 9/2001 | Ho | F16M 11/22 248/407 |
| 6,505,429 B2 * | 1/2003 | Percival | F41A 23/12 248/164 |
| 6,688,565 B1 * | 2/2004 | Chen | F16M 11/38 248/188.7 |
| 6,895,709 B1 * | 5/2005 | Krien | F41C 33/001 89/37.01 |
| 7,314,207 B2 * | 1/2008 | Jones | F16L 3/02 248/676 |
| 7,775,203 B1 * | 8/2010 | Patrick | F24C 3/14 248/165 |
| 8,109,476 B2 * | 2/2012 | Roberts | B65B 67/1205 248/173 |
| 8,146,876 B1 * | 4/2012 | Young | F16B 7/1409 248/161 |
| 8,776,811 B2 * | 7/2014 | Griffith | E04H 12/2238 248/125.7 |
| 9,066,512 B2 * | 6/2015 | Nolz | E04H 15/44 |
| 9,200,859 B2 * | 12/2015 | Antell | F41A 23/10 |
| 9,254,055 B2 * | 2/2016 | Wong | A47G 33/12 |
| 9,746,268 B2 * | 8/2017 | Antell | F41A 23/10 |
| 9,874,237 B1 * | 1/2018 | Osler | F16M 11/22 |
| 10,208,889 B2 * | 2/2019 | Jaggard | F16M 11/242 |
| 10,807,665 B1 * | 10/2020 | Ybarra, Jr. | B62H 3/10 |
| 10,969,657 B2 * | 4/2021 | Christensen | G03B 15/02 |
| 2005/0016354 A1 * | 1/2005 | Kent | F16M 11/242 84/327 |
| 2007/0080268 A1 * | 4/2007 | Worrell | E04F 21/06 248/177.1 |
| 2009/0039230 A1 * | 2/2009 | Cheng | A47G 33/12 248/523 |
| 2010/0301180 A1 * | 12/2010 | Chiu | B25H 1/04 248/170 |
| 2015/0374117 A1 * | 12/2015 | Lozano | F16M 11/32 248/447.2 |

\* cited by examiner

COLLAPSIBLE POLE STAND

BACKGROUND

The embodiments described herein relate generally to construction and line worker tools and, more particularly, to a collapsible pole stand for framing a pole before it is erected.

During line work, linemen often need to frame all sides of a utility pole on the ground before it is installed. However, while framing a utility pole, the pole may inadvertently roll side-to-side, making framing more difficult.

While there are existing pole stands for holding a pole during framing, the existing pole stands take a significant amount of space to store. Moreover, the existing pole stands wear out their rotation mechanism and, thus, are prone to failure. Furthermore, the cradle portion of the existing stands (i.e., the portion that holds the pole) is U-shaped, which allows for rotation. Additionally the U-shaped cradle is specific to a particular sized pole and, as such, may be too small or too large for certain poles.

Therefore, what is needed is a collapsible pole stand designed to hold a utility pole during framing while reducing or preventing rotating of the pole within the stand, wherein the rotation mechanism on the pole stand is more robust than existing devices.

SUMMARY

Some embodiments of the present disclosure include a collapsible pole stand for holding a pole during, for example, framing prior to pole installation during line work. The pole stand may include a shaft; a pair of arms extending upward from the shaft, wherein the pair of arms form an upward V-shape; a middle collar rotatably engaged proximal to a middle section of the shaft; a pair of long legs attached to and extending downward from the middle collar, wherein the pair of long legs form a downward V-shape; a lower collar engaged proximal to a bottom section of the shaft; and a pair of short legs extending downward from the lower collar, wherein the pair of short legs form a smaller downward V-shape.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
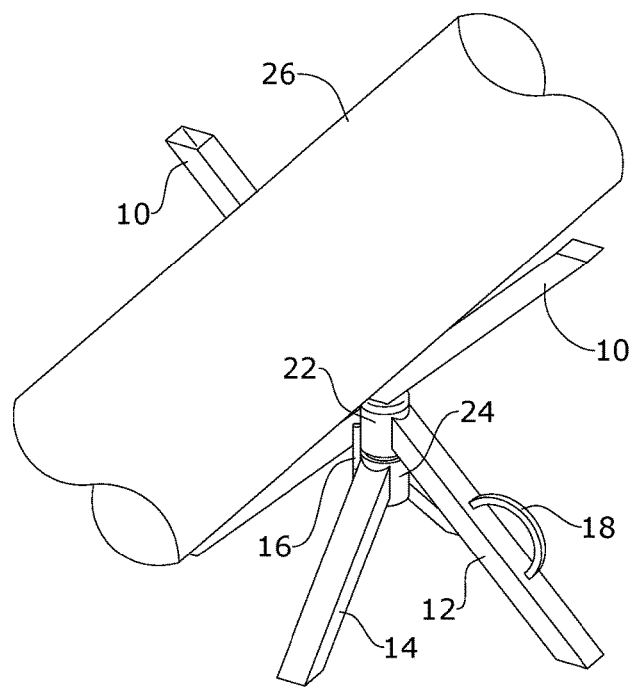
FIG. 1 is a perspective view of one embodiment of the present disclosure, shown in use.
Figure 2:
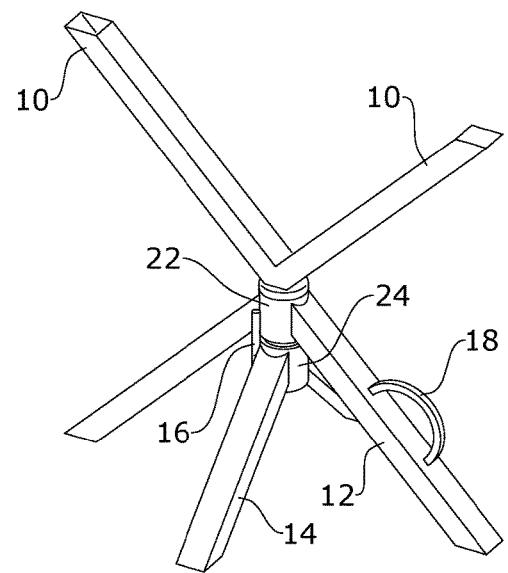
FIG. 2 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a pole stand and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-8, some embodiments of the present disclosure include a collapsible pole stand for holding a pole 26 during, for example, framing, the collapsible pole stand comprising a shaft 20, a pair of arms 10 extending upward from the shaft 20, wherein the pair of arms 10 form an upward V-shape; a middle collar 22 rotatably engaged proximal to middle section of the shaft 20; a pair of long legs 12 attached to and extending from the middle collar 22, wherein the pair of long legs 12 form a downward V-shape; a lower collar 24 rotatably engaged proximal to a bottom section of the shaft 20; and a pair of short legs 14 extending downward from the lower collar 24, wherein the pair of short legs 14 form a smaller downward V-shape. Some embodiments of the collapsible pole stand further comprise a stopper 16 attached to an outer surface of the lower collar 24 and extending upward past a top edge of the lower collar 24. In some embodiments, the collapsible pole stand may further comprise a handle 18 positioned on, for example, an outer surface of at least one of the pair of long legs 12.

While the lower collar 24 is described as being rotatable engaged with the shaft 20, in some embodiments, the lower collar 24 may be fixedly attached to the shaft 20, thus preventing rotation of the pair of short legs 14 with respect to the shaft 20. In such embodiments, the pair of short legs 14 may be substantially planar with the pair of arms 10 and only the pair of long legs 12 may be capable of rotation about the shaft 20. Thus, the pair of short legs 14 may be also referred to as stationary legs. In such embodiments, the stopper 16 extending upward from the lower collar 22 may only allow the middle collar 22 to rotate a predetermined distance, such as 90 degrees.

As shown in the Figures, the shaft 20 may be a cylindrical shaft. Each of the middle collar 22 and the lower collar 24 may comprise hollow cylinders with an inner diameter sufficient to accommodate the shaft 20 therein while allowing the collars 22, 24 to rotate about the shaft 20, allowing for independent motion of the pair of long legs and the pair of short legs 14 with respect to the pair of arms 10.

As shown in the Figures, each of the arms 10, long legs 12, and short legs 14 may have a non-circular or non-rounded cross-section. Rather, for example, each of the arms 10, long legs 12, and short legs 14 may have a squared-off cross section. In fact, each of the arms 10, long legs 12, and short legs 14 may comprise square tubing.

In use, the pair of top-legs 10 forming the upward V-shape may provide a cradle for placement of a pole 26 therein, as shown in FIG. 1. Because of the squared-off cross section and V-shaped cradle, rotation of the pole 26 within the cradle may be reduced or eliminated, thus increasing the ease of framing. The V-shaped cradle also allows for different pole sizes being accommodated within a single pole stand.

Figure 3:
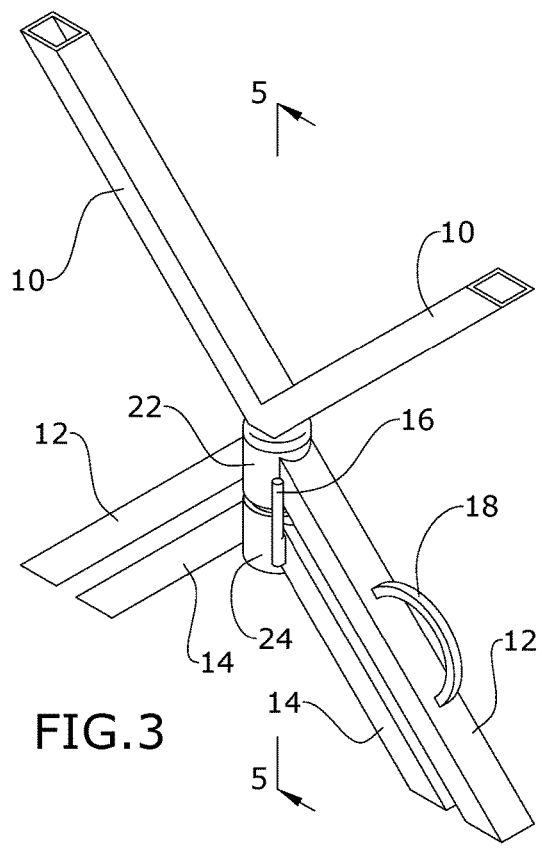
FIG. 3 is a perspective view of one embodiment of the present disclosure, shown collapsed.
Figure 4:
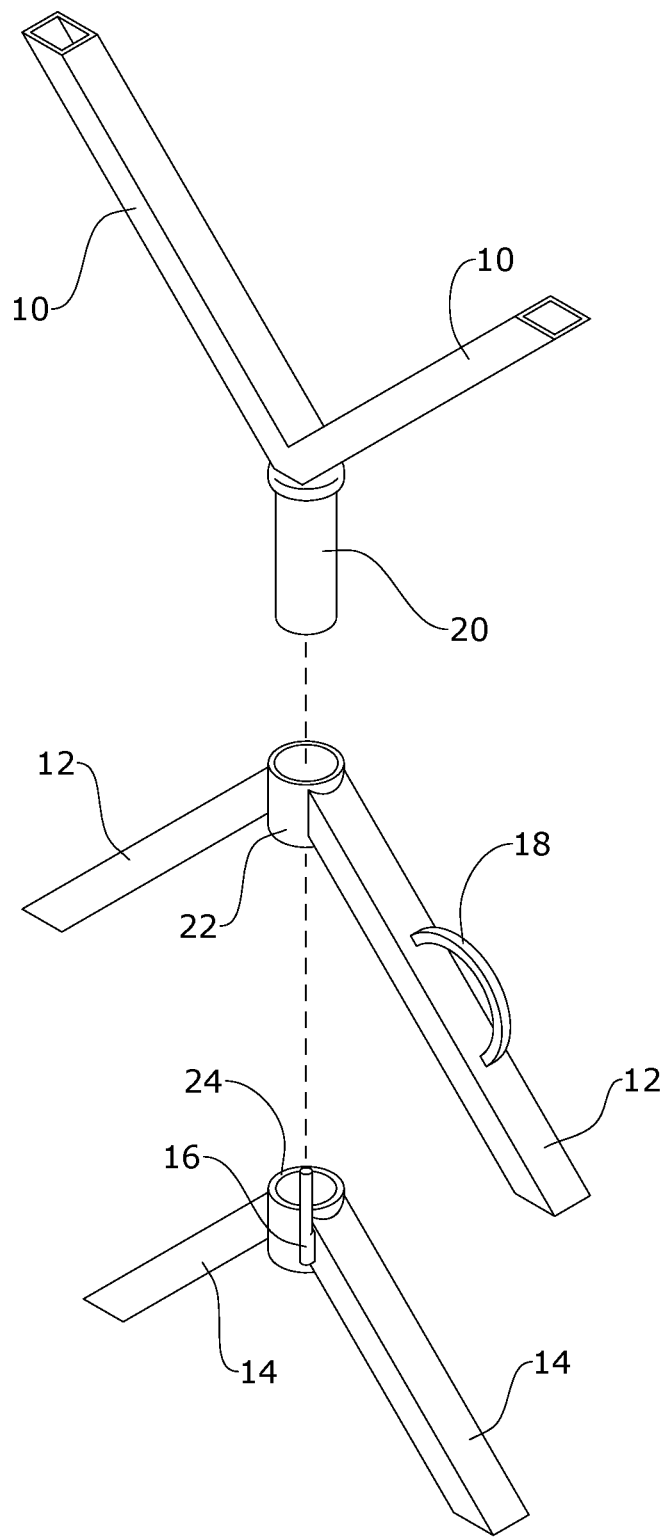
FIG. 4 is an exploded view of one embodiment of the present disclosure.
Figure 5:
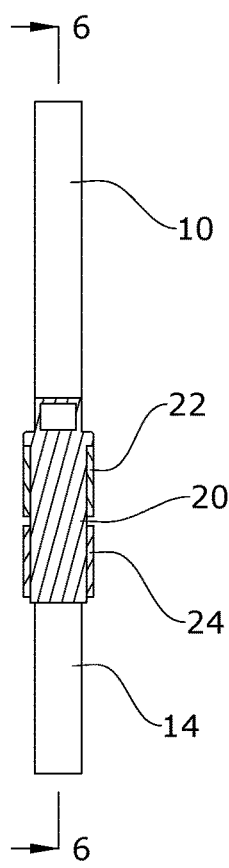
FIG. 5 is a section view of one embodiment of the present disclosure, taken along line 5-5 in FIG. 3.
Figure 6:
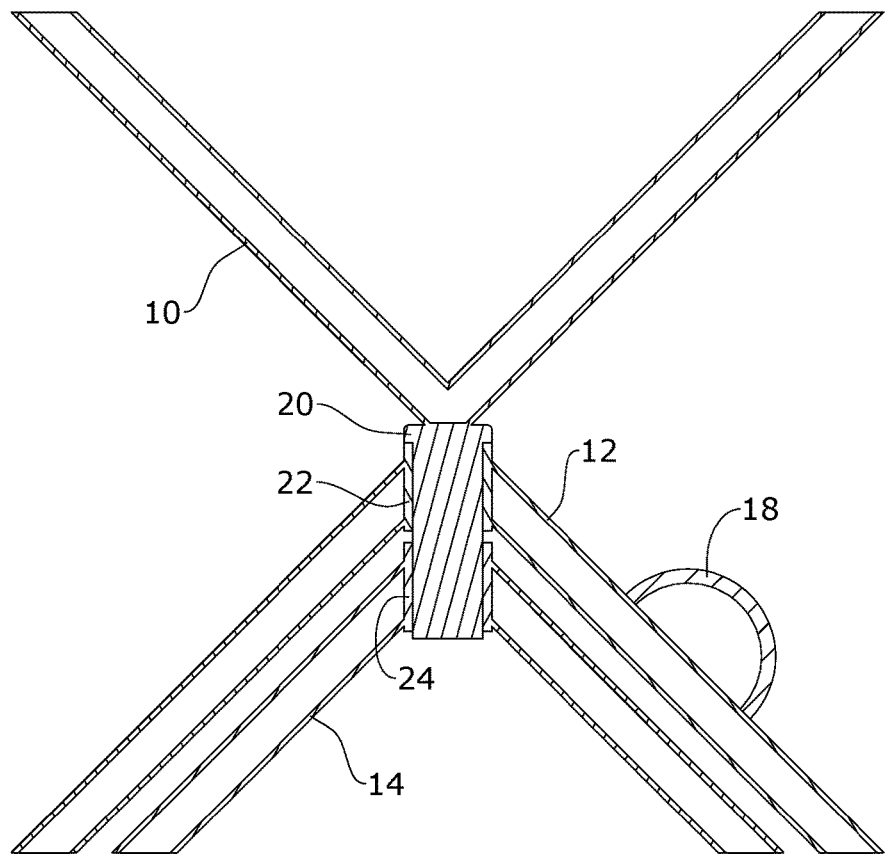
FIG. 6 is a section view of one embodiment of the present disclosure, taken along line 6-6 in FIG. 5.
Figure 7:
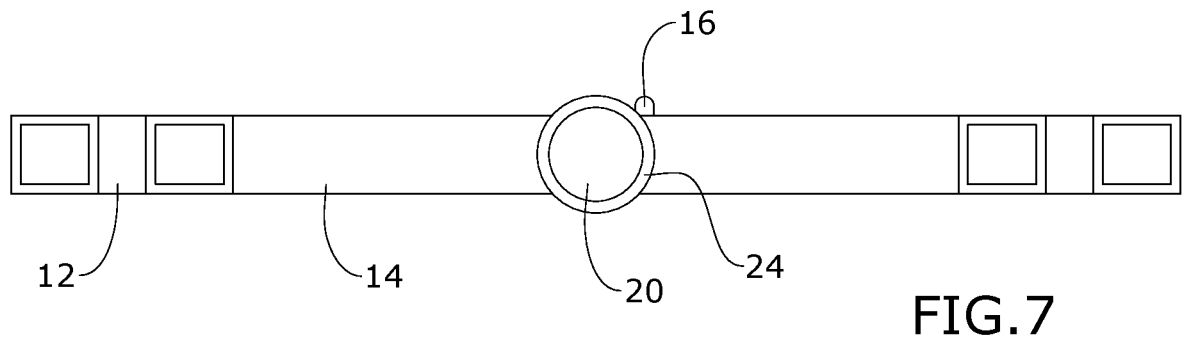
FIG. 7 is a bottom view of one embodiment of the present disclosure.
Figure 8:
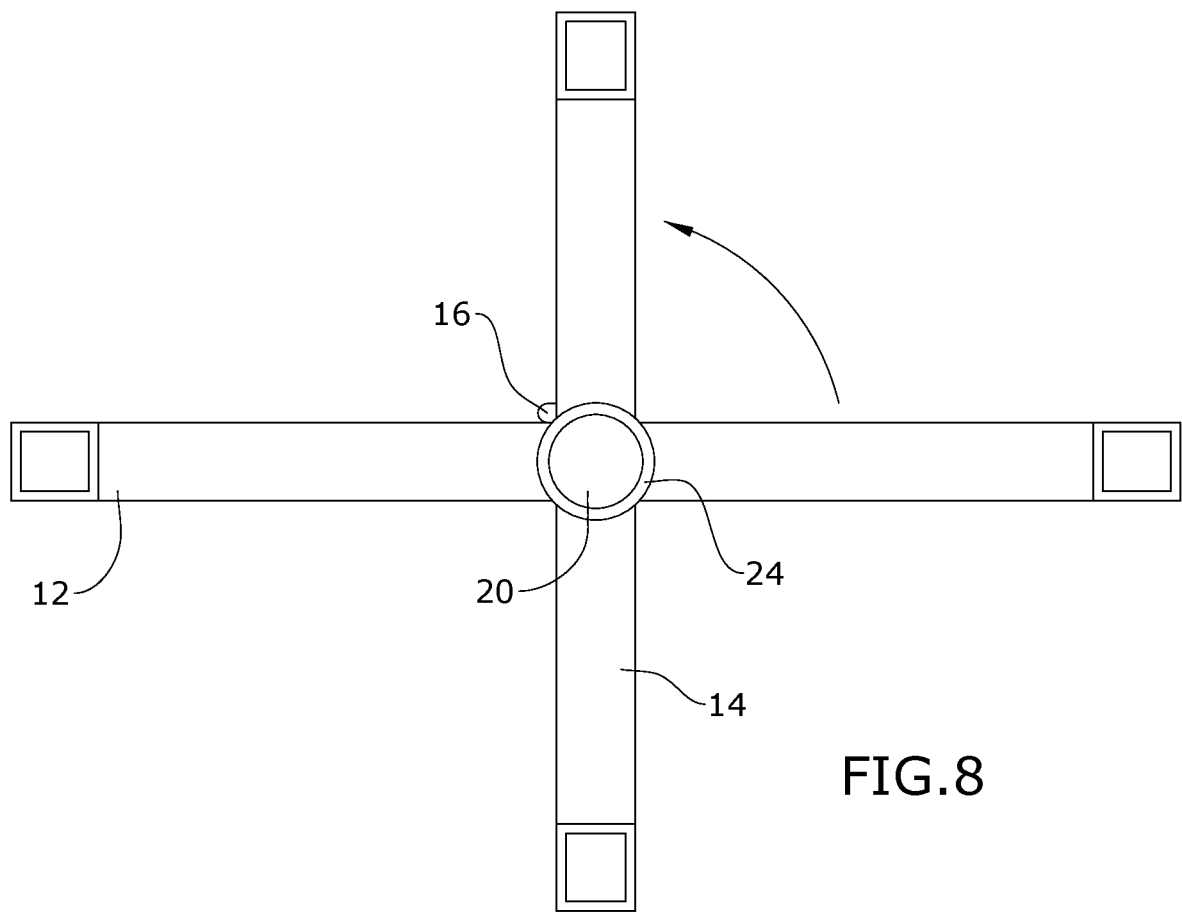
FIG. 8 is a bottom view of one embodiment of the present disclosure.

The pair of long legs 12 and the pair of short legs 14, together, may form support legs for the pole stand during use. The pair of long legs 12 may each have a length greater than the length of each of the pair of short legs 14. In fact, the short legs 14 may each have a length sufficient for being nested within the downward V-shape formed by the pair of long legs 12 when the pole stand is collapsed, as shown in FIGS. 3 and 6.

While not particularly limited, the handle 18 may comprise any suitable handle structure allowing a user to grab and rotate the pair of long legs 12. For example, as shown in the Figures, the handle 18 may be a semi-circle.

The device of the present disclosure may be made of any suitable materials and, in some embodiments, may comprise steel or any other suitable rigid material, such as aluminum or carbon fiber. The components may be attached to one another using any known means and, in the case of steel components, they may be welded together where applicable.

To use the pole stand of the present disclosure, the pair of long legs 12 may simple be rotated until they hit the stopper 16, providing a stable base together with the pair of short legs. One end of the pole 26 may be placed into the V-shaped cradle to be worked on. The pole 26 may be lifted and rotated as needed. When work is complete, the pair of long legs 12 may be rotated back to a collapsed position, wherein a collapsed position is defined as a position wherein all of the legs 10, 12, 14 are in a substantially planar configuration. While the pole stand is described above for being used in line work, it is not limited to such use. For example, it may be beneficial for use in pole installation, utility piping installations, tree installations, and the like.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A collapsible pole stand for holding a pole, the collapsible pole stand comprising:
   a shaft;
   a pair of arms extending upward from the shaft, wherein the pair of arms form an upward V-shape such that the arms converge at a bottom point, and wherein the pair of arms are perpendicular to one another;
   a middle collar rotatably engaged proximal to a middle section of the shaft;
   a pair of long legs attached to and extending downward from the middle collar, wherein the pair of long legs form a downward V-shape and wherein the pair of long legs is configured to rotate with respect to the pair of arms;
   a lower collar engaged proximal to a bottom section of the shaft; and
   a pair of short legs extending downward from the lower collar, wherein the pair of short legs form a smaller downward V-shape.

2. The collapsible pole stand of claim 1, wherein each long leg of the pair of long legs has a longer length than each short leg of the pair of short legs.

3. The collapsible pole stand of claim 2, wherein the pair of short legs is sized to be nested within the downward V-shape when the pole stand is in a collapsed configuration.

4. The collapsible pole stand of claim 1, further comprising a stopper attached to and extending upward from an outer surface of the lower collar.

5. The collapsible pole stand of claim 1, further comprising a handle attached to an outer surface of at least one long leg of the pair of long legs.

6. The collapsible pole stand of claim 1, wherein the lower collar is fixedly attached to the shaft.

7. The collapsible pole stand of claim 6, wherein the pair of short legs is planar with the pair of arms.

8. The collapsible pole stand of claim 1, wherein each of the pair of arms, the pair of long legs, and the pair of short legs comprises square tubing.

* * * * *